United States Patent [19]

Noda

[11] 4,389,605
[45] Jun. 21, 1983

[54] PULSE MOTOR DRIVING APPARATUS

[75] Inventor: Atsushi Noda, Yokohama, Japan

[73] Assignee: Canon Kabushiki Kaisha, Tokyo, Japan

[21] Appl. No.: 335,720

[22] Filed: Dec. 30, 1981

Related U.S. Application Data

[63] Continuation of Ser. No. 134,772, Mar. 28, 1980, abandoned.

[30] Foreign Application Priority Data

Apr. 4, 1979 [JP] Japan ................................. 54-40533

[51] Int. Cl.³ ............................................. G05B 19/40
[52] U.S. Cl. .................................... 318/696; 318/138; 318/254; 318/439
[58] Field of Search ................... 318/138, 254, 254 A, 318/439, 696

[56] References Cited

U.S. PATENT DOCUMENTS

| | | | |
|---|---|---|---|
| 3,473,069 | 10/1969 | Herbert | 318/138 |
| 3,588,661 | 6/1971 | Newell | 318/696 |
| 3,767,993 | 10/1973 | Yablonski | 318/696 |
| 4,015,179 | 3/1977 | Endo | 318/383 X |
| 4,129,816 | 12/1978 | Feldy | 318/696 |
| 4,220,904 | 9/1980 | Leenhouts | 318/696 |

*Primary Examiner*—B. Dobeck
*Attorney, Agent, or Firm*—Fitzpatrick, Cella, Harper & Scinto

[57] ABSTRACT

A pulse motor is improved in its stability at the time of low revolution while maintaining the possibility of high revolution. Between the terminals of pulse motor windings there are parallel-connected current control means. The braking effect of said current control means is controlled depending upon the revolution of the pulse motor so as to stabilize the revolution at a low speed. It assures also a high speed revolution when desired. This arrangement of the invention enables to provide a pulse motor which is small in size and low in cost. When the present invention is embodied in a driving system for a carriage of printing head in a printer, all the performances required therefor can be attained.

19 Claims, 5 Drawing Figures

[4,389,605]

PULSE MOTOR DRIVING APPARATUS

This is a continuation of application Ser. No. 134,772, filed Mar. 28, 1980 now abandoned.

BACKGROUND OF THE INVENTION

1. Field of the Invention

The present invention generally relates to a pulse motor driving apparatus. More particularly, the present invention is directed to such pulse motor driving apparatus which can improve the stability of stepping revolution at the time of low revolution speed and which can also assure a high revolution whenever it is wished.

2. Description of the Prior Art

For the pulse motor used for driving a carriage of printing head in a printer it is generally required that at the time of the printing operation phase a stable and low speed stepping revolution can be obtained on one hand and at the time of the quick drive phase or carriage return a possible higher revolution can be obtained, on the other hand. Hitherto, many attempts have been made to satisfy the requirement. However, all the solutions already proposed have led to a substantial increase in size of the pulse motor itself as well as in its manufacturing cost.

SUMMARY OF THE INVENTION

Accordingly, it is an object of the invention to provide a pulse motor driving apparatus which improves the stability of pulse motor operation at the time of low revolution and also enables a high revolution of the pulse motor when necessary.

It is another object of the invention to provide a pulse motor which is small in size and low in manufacturing cost.

It is a further object of the invention to provide a driving apparatus which is adaptable for driving a printer head carriage and which has a high performance required for this purpose.

Other and further objects, features and advantages of the invention will appear more fully from the following description taken in connection with the accompanying drawings.

DESCRIPTION OF THE PREFERRED EMBODIMENTS

Figure 1:
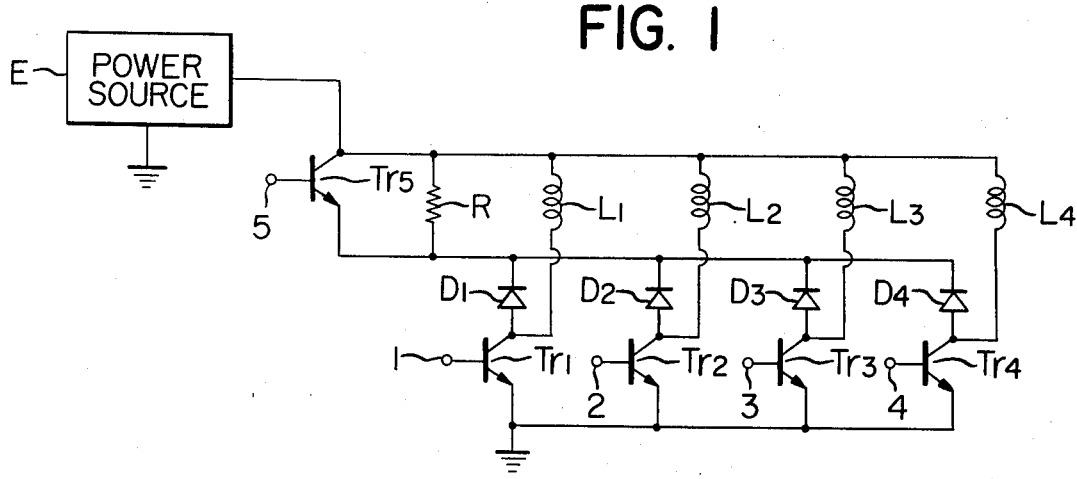
FIG. 1 is a circuit diagram showing an embodiment of the invention.

Referring first to FIG. 1 showing a first embodiment comprising, as an example, a four-phase pulse motor, $L_1$, $L_2$, $L_3$ and $L_4$ designate the windings of the pulse motor. On the non-ground side, the terminals of the windings are connected to a winding excitation power source E. On the ground side, terminals of the windings are grounded through switching transistors $Tr_1$, $Tr_2$, $Tr_3$ and $Tr_4$ respectively.

By sequentially applying control pulse signals to input terminals 1, 2, 3 and 4 at the gate side of the transistors $Tr_1$, $Tr_2$, $Tr_3$ and $Tr_4$, the windings $L_1$, $L_2$, $L_3$ and $L_4$ are excited so that the output shaft of the pulse motor may be brought into rotation.

The ground side terminals of the windings $L_1$, $L_2$, $L_3$ and $L_4$ are also connected to the anode side terminals of diodes $D_1$, $D_2$, $D_3$ and $D_4$ respectively the cathode side terminals of which are connected to the winding excitation power source E through a control transistor $Tr_5$. Connected between the emitter-collector of the control transistor $Tr_5$ is a control resistor R. If desired, the control transistor $Tr_5$ may be replaced by a lead switch.

Figure 2A:
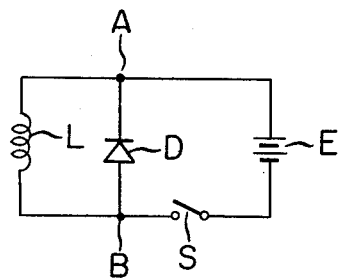
FIG. 2(a) is a circuit diagram showing an equivalent circuit in the embodiment at its low revolution phase of operation.

The manner of operation of the above first embodiment is as follows:

During the phase of lower revolution such as the time of printing being effected in a printer, the input terminal 5 at the gate side of the control transistor $Tr_5$ receives a signal which serves to turn the transistor $Tr_5$ on. In this position, the excitation circuit of each winding of the pulse motor may be represented by an equivalent circuit shown in FIG. 2(a). In FIG. 2A, the winding L is excited by closing the switch S (switching transistor). When the switch is opened thereafter, there is produced a back electromotive force between the terminals A and B, which serves to brake the rotation of the pulse motor. Therefore, a sure stepping revolution of the pulse motor is attainable at the time of relatively low revolution.

Figure 2B:
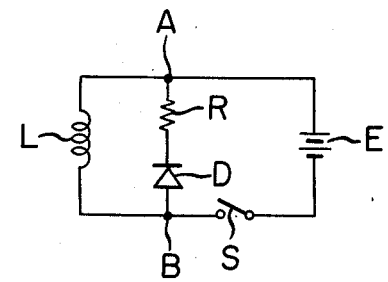
FIG. 2(b) is a circuit diagram showing an equivalent circuit in the embodiment for enabling a high revolution.

On the contrary, during the phase of higher revolution such as the time of quick drive of printer or carriage return, no signal is applied to the input terminal at the gate side of the control transistor $Tr_5$ and therefore there is formed an equivalent circuit as shown in FIG. 2(b). In the position shown in FIG. 2(b) the winding L is excited by closing the switch S in the same manner as in FIG. 2(a). However, in case the of FIG. 2(b) circuit, the back electromotive force produced between the terminals A and B by opening the switch S is consumed in the control resistor R. This reduces the above mentioned braking effect and therefore the pulse motor is allowed to speed up its stepping rotation so as to follow the high speed switching operations of transistors $Tr_1$, $Tr_2$, $Tr_3$ and $Tr_4$ shown in FIG. 1.

Figure 3:
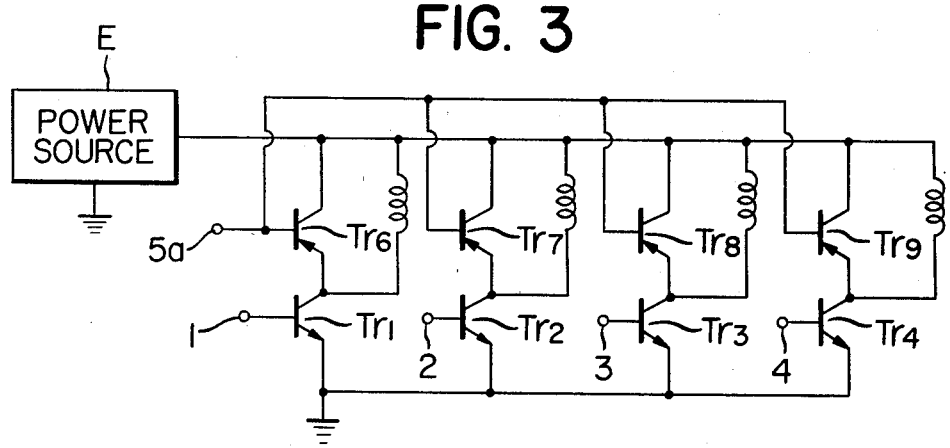
FIG. 3 is a circuit diagram showing a second embodiment of the invention.

FIG. 3 shows a second embodiment of the present invention which again comprises, as an example, a four-phase pulse motor.

In FIG. 3, the windings $L_1$, $L_2$, $L_3$ and $L_4$ of the pulse motor have terminals connected to a winding excitation power source E at non-ground side. At ground side, the other terminals of the windings $L_1$, $L_2$, $L_3$ and $L_4$ are grounded through switching transistors $Tr_1$, $Tr_2$, $Tr_3$ and $Tr_4$ respectively.

By applying control pulse signals sequentially to the input terminals 1, 2, 3 and 4 at the gate side of the switching transistors $Tr_1$, $Tr_2$, $Tr_3$ and $Tr_4$ the windings $L_1$, $L_2$, $L_3$ and $L_4$ are excited so that the output shaft of the pulse motor may be brought into rotation.

The ground side terminals of the windings $L_1$, $L_2$, $L_3$ and $L_4$ are also connected to the emitter side terminals of control transistors $Tr_6$, $Tr_7$, $Tr_8$ and $Tr_9$ the collector side terminals of which are connected to the power source E.

The manner of operation of the second embodiment is as follows:

During the phase of relatively low revolution such as the time of printing being effected, a signal is applied to an input terminal 5a at gate side. The input terminal 5a is common to all the control transistors Tr₆, Tr₇, Tr₈ and Tr₉ and the signal applied to the common terminal is such signal which serves to turn the control transistors on. The equivalent circuit shown in FIG. 4 represents the excitation circuit of each winding of the pulse motor.

Figure 4:
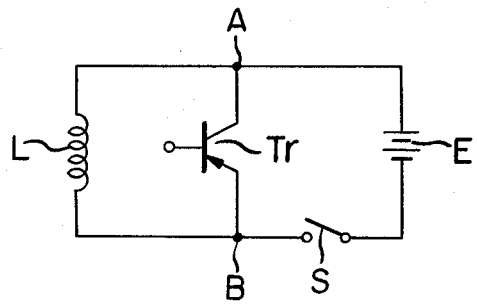
FIG. 4 is a circuit diagram showing an equivalent circuit of the second embodiment.

In the position shown in FIG. 4, the winding L is excited by closing the switch S (switching transistor). When the switch S is opened thereafter, a back electromotive force is produced between the terminals A and B. This will serve as a brake to the rotation of the pulse motor provided that the input terminal 5a at the gate side of the control transistor Tr is receiving at that time a signal which renders the transistor Tr conductive. Therefore, in this manner, a stable and sure stepping rotation of the pulse motor can be attained at the time of relatively low revolution.

On the contrary, during the phase of high revolution such as a quick drive of a printer or carriage return, there is applied to the input terminal 5a such signal which makes the transistor Tr equivalent to the resistor R shown in FIG. 2B. Under this condition, the back electromotive force produced between the terminals A and B by opening the switch S will be consumed in the equivalent resistor R of the control transistor Tr. Therefore, the braking effect is reduced accordingly. Thus, the pulse motor is allowed to speed up its stepping rotation so as to follow the high speed switching operations of transistors Tr₆, Tr₇, Tr₈ and Tr₉. Furthermore, there is provided the possibility of setting various steps of high revolution by applying an optional signal to the input terminal 5a.

As will be understood from the above embodiments, the driving apparatus according to the invention is very simple in circuit arrangement and is adaptable for a conventional small and inexpensive pulse motor for use in a printer without need of extensive change in design and size of the pulse motor. By employing the arrangement of the invention, the maximum performance is attainable over the entire range from low revolution to high revolution required to move a printing head carriage in a printer while holding the merit of small size of the pulse motor.

While the invention has been particularly shown and described with reference to preferred embodiments thereof, it will be understood by those skilled in the art that the foregoing and other changes in form and details can be made therein without departing from the spirit and scope of the invention.

What I claim is:

1. A pulse motor driving apparatus comprising:
   resistor means having an electric resistance connected in series with the winding of a pulse motor and with rectifying means having a rectification characteristic to form a closed circuit and
   control means connected in parallel with said resistor means and disposed to control said resistor means in such manner that at the time of low revolution of said pulse motor said resistor means may be short-circuited.

2. A pulse motor driving apparatus according to claim 1, wherein said rectifying means comprises a diode which makes the back electromotive force generated in said pulse motor winding conducted and said control means comprises a transistor.

3. A pulse motor driving apparatus according to claim 1, wherein said rectifying means comprises a diode which makes the back electromotive force generated in said pulse motor winding conducted and said control means comprises a lead switch.

4. A pulse motor drivnig apparatus comprising:
   at least one resistor means having an electric resistance connected in series with windings of a pulse motor and with a plural number of rectifying means having rectification characteristics to form closed circuits and
   at least one control means connected in parallel with said resistor means and disposed to control said resistor means in such manner that at the time of low revolution of said pulse motor said resistor means may be short-circuited.

5. A pulse motor driving apparatus according to claim 4, wherein said plural number of rectifying means comprise a plural number of diodes which make the electromotive force generated in said pulse motor windings conducted and said at least one control means comprises at least one transistor.

6. A pulse motor driving apparatus according to claim 4, wherein said plural number of rectifying means comprise a plural number of diodes which make the electromotive force generated in said pulse motor windings conducted and said at least one control means comprises at least one lead switch.

7. A pulse motor driving apparatus comprising:
   a plurality of electric elements which are connected in series with each other;
   a winding of a pulse motor connected in parallel with said electric elements;
   current control means connected in parallel with one of said electric elements and disposed to control the amount of current flow in at least two different states by a back electromotive force generated in said pulse motor winding; and
   switching means for controlling the supply of current to said pulse motor winding.

8. A pulse motor driving apparatus according to claim 7, wherein said current control means comprises a transistor or transistors.

9. A pulse motor driving apparatus according to claim 7 or 8, wherein said electric elements comprise an arrangement of recitifying means having a rectification characteristic, and resistor means having an electric resistance connected to said rectifying means in series and connected in parallel with said current control means.

10. A pulse motor driving apparatus according to claim 9, wherein said recitfying means comprises a diode connected in such direction in which the back electromotive force generated in the pulse motor winding may be transmitted.

11. A pulse motor driving apparatus comprising
    a plurality of transistors connected in parallel with the windings of a pulse motor respectively, said transistors comprising means for controlling the amount of current flow in at least two different states of said transistors by a back electromotive force generated in said pulse motor windings, the respective base terminals of said transistors being connected in common; and
    a plural number of switching means for controlling the supply of current to said pulse motor windings respectively.

12. A pulse motor driving apparatus for a pulse motor having a plurality of windings, comprising:

a plurality of groups of transistors, the transistors in each group being connected in series with each other, and each said group of transistors being associated with a different one of said plurality of windings, and each said winding being connected in parallel with one of the transistors of its associated group.

13. A pulse motor driving apparatus comprising:
at least one resistor means having an electric resistance;
a plural number of rectifying means having a rectification characteristic, each of which is connected in series with said resistor means;
a plurality of pulse motor windings each of which is connected across the associated rectifying means and said resistor means;
at least one transistor connected in parallel with said resistor means for controlling the amount of current flow in at least two different states by a back electromotive force generated in said pulse motor windings; and
a plural number of switching means for controlling the supply of current to said pulse motor windings, respectively.

14. A pulse motor driving apparatus according to claim 13, wherein said plural number of rectifying means comprise a plural numer of diodes connected in such a direction that the back electromotive force generated in said pulse motor windings may be transmitted.

15. A pulse motor driving apparatus comprising:
current control means connected in parallel with the winding of a pulse motor and disposed to control the amount of current flow in at least two different states by a back electromotive force generated in said pulse motor winding, said current control means comprising an arrangement of rectifying means having a rectification characteristic, resistor means having an electric resistance connected to said rectifying means in series and at least one transistor connected in parallel with said resistor means, and
switching means for controlling the supply of current to said pulse motor winding.

16. A pulse motor driving apparatus according to claim 15, wherein said rectifying means comprises a diode connected in such direction in which the back electromotive force generated in the pulse motor winding may be transmitted.

17. A pulse motor driving apparatus comprising:
at least one current control means comprising a plural number of transistors which have, at the side of the base thereof, a terminal common to all, said control means being connected parallel with the windings of a pulse motor respectively and disposed to control the amount of current flow in at least two different states via back electromotive force generated in said pulse motor windings, and
a plural number of switching means for controlling the supply of current to said pulse motor windings, respectively.

18. A pulse motor driving apparatus comprising:
at least one current control means comprising an arrangement of a plural number of rectifying means each having a rectification characteristic, at least one resistor means having an electric resistance connected with said rectifying means in series and at least one transistor connected in parallel with said resistor means, said control means being connected parallel with the windings of a pulse motor respectively and disposed to control the amount of current flow in at least two different states via back electromotive force generated in said pulse motor windings, and
a plural number of switching means for controlling the supply of current to said pulse motor windings, respectively.

19. A pulse motor driving apparatus according to claim 18, wherein said plural number of rectifying means comprise a plural number of diodes connected in such direction in which the back electromotive force generated in said pulse motor windings may be transmitted.

* * * * *